Figure 1:
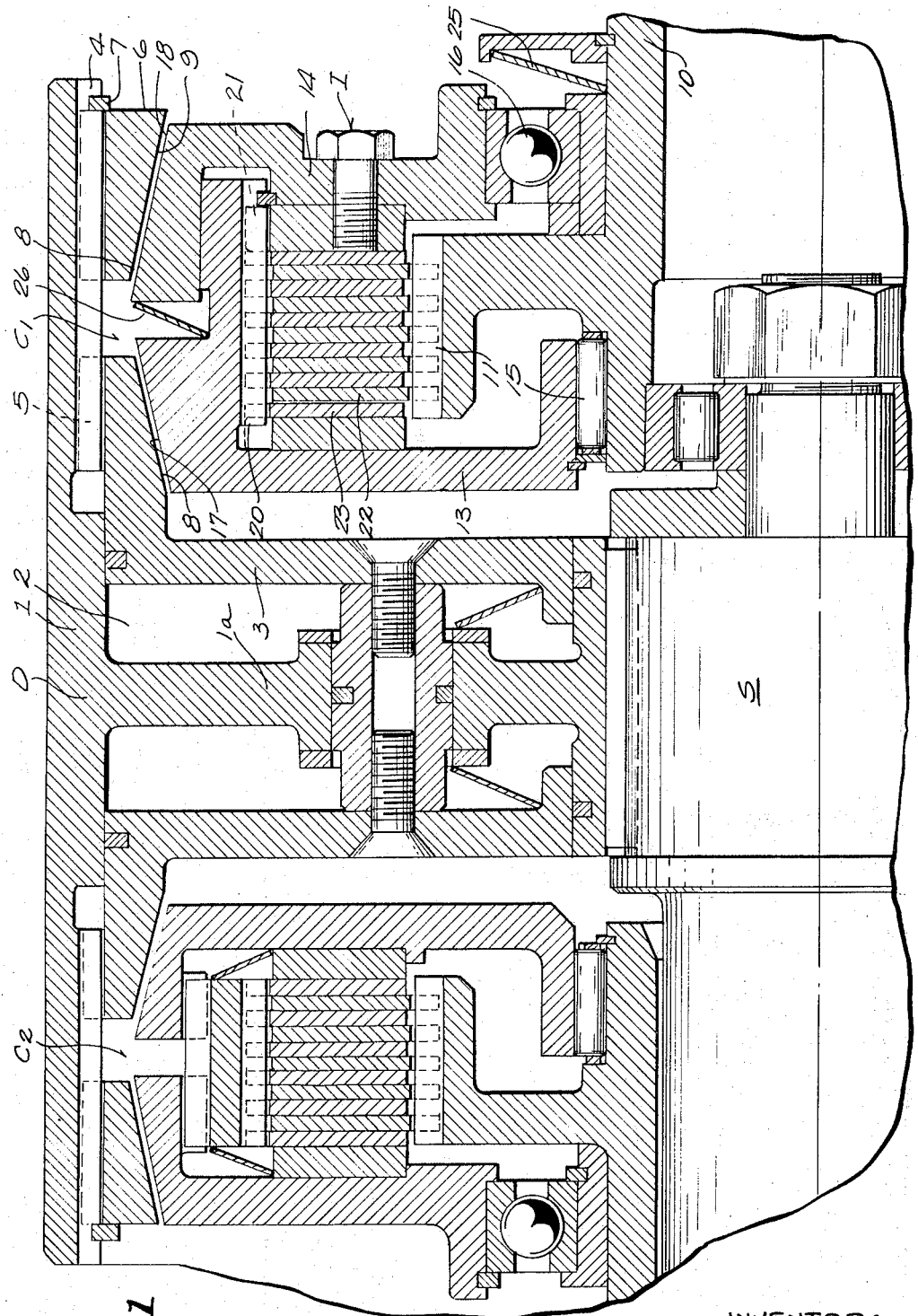

Jan. 9, 1968  G. R. ASCHAUER  3,362,511

CONE AND FRICTION PLATE CLUTCHES IN SERIES

Filed March 31, 1966  2 Sheets-Sheet 1

INVENTOR:
GEORGE R. ASCHAUER
BY: James E. Nilles
ATTORNEY

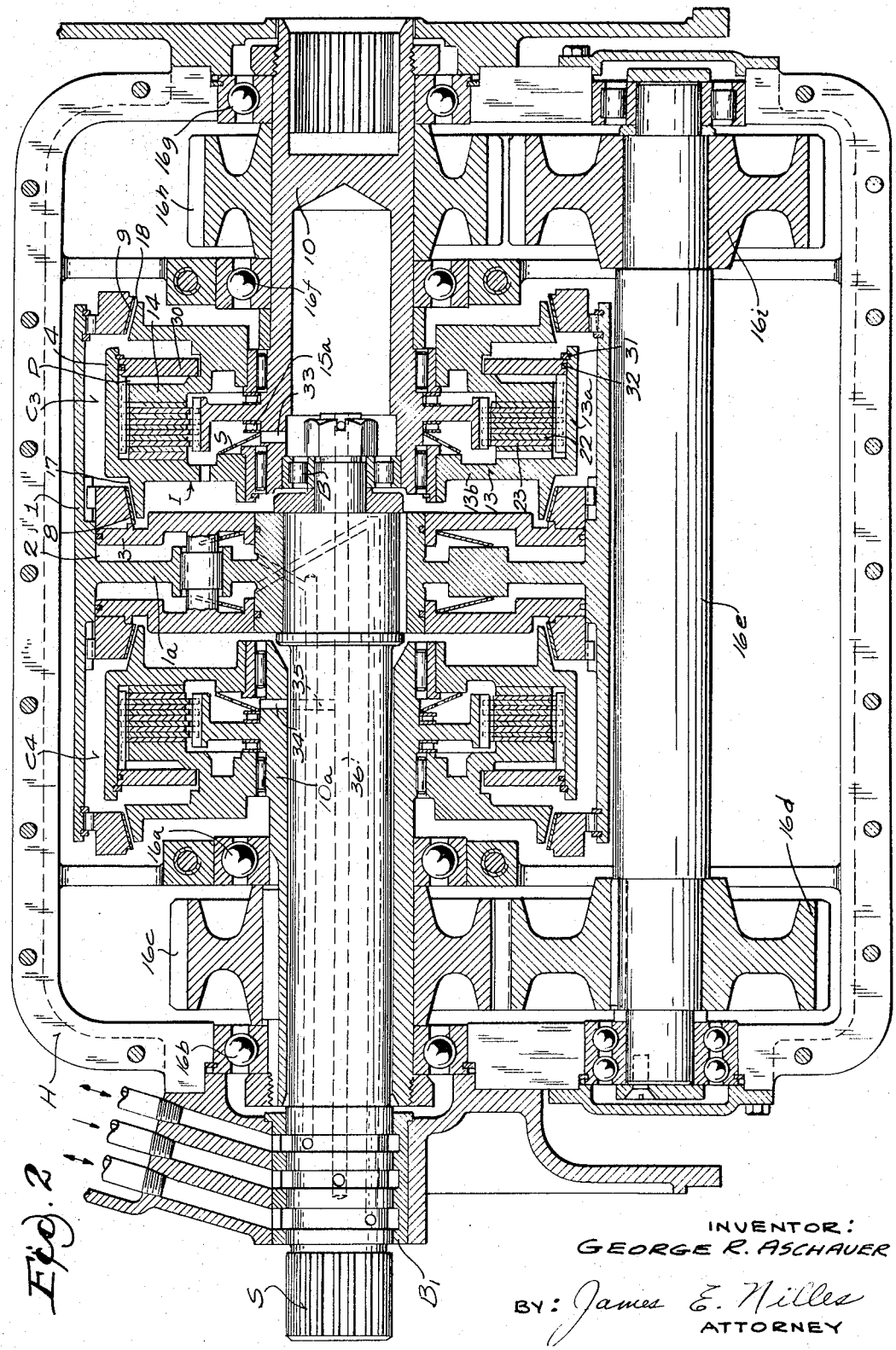

1

3,362,511
CONE AND FRICTION PLATE CLUTCHES IN SERIES
George R. Aschauer, Racine, Wis., assignor to Twin Disc, Incorporated, a corporation of Wisconsin
Filed Mar. 31, 1966, Ser. No. 539,132
18 Claims. (Cl. 192—48)

This invention relates generally to friction clutches and more particularly to that type of clutch mechanism which combines both a cone clutch and a friction plate clutch.

The present invention is an improvement over the subject matter of my U.S. application Ser. No. 462,504 filed June 9, 1965, and now Patent No. 3,324,981 entitled, "Combined Cone and Plate Type Clutch Mechanism."

A convenientional cone type clutch has several advantages such as complete and quick disengagement, good mechanical advantage due to its wedging action and substantial torque transmitting characteristics. On the other hand, cone clutches do not readily accommodate large quantities of heat, and when hot they tend to expand and "lock."

In a combined cone and plate type clutch, the cone provides a clean release and is capable of carrying heavy torque loads, while the plate type clutch provides good energy absorption and dissipation of heat.

In the device shown in the said copending application, the cone and friction plate cltuches are arranged in series for transmitting torque from the driving member to the driven member, and the friction plate clutch is constantly engaged under the influence of a resilient means, such as as a spring. With that device, the friction plates slipped under full torque load and the mechanism was incapable of being modulated, that is, "creeping," when the full load was applied, and creeping had to be accomplished, if desired, with the cone clutch.

In accordance with the present invention, a combined cone and friction type clutch is provided in which the cone clutch includes a pair of opposed, inclined surfaces which are urged apart by resilient means; the friction plate type clutch is located between these opposed surfaces and is clamped up or engaged by the relative axial movement between the opposed cone surfaces. The cone and friction plate clutches are arranged in series to transmit the torque and are both engageable by the same common axial thrust. Stated otherwise, a single force actuates both the cone and friction plate cltuches, the latter being engaged subsequent to at least initial engagement of the cone clutch.

A more specific object of the present invention relates to a combined clutch of the above type wherein the friction plate clutch is caused to be engaged only after both of the opposed surfaces of the cone clutch are in engagement.

It has been attempted in certain prior art friction plate clutches to encapsulate the friction plates in oil in order to keep them lubricated and extend their life. Such efforts have not been wholly successful because of the high release drag and consequent horsepower loss and also because of the hydraulic unbalance between the parts due to the centrifugal head of the oil.

Accordingly, another more limited aspect of the present invention relates to a combined cone and friction type clutch of the above type which has means for encapsulating the friction discs in oil to keep them lubricated and this is accomplished without (1) causing hydraulic unbalance which would otherwise effect the clutch plate engaging pressure or (2) objectionable release drag.

With the improved clutch provided by the present invention, a softer engaging action is provided and the clutch can be feathered, modulated or made to creep as desired.

The invention provides a combined cone and friction plate clutch having spaced apart and opposed cone clutch surfaces which move toward one another in the engaging direction to clamp or pinch together the clutch plates which are located axially between the cone clutches; the cone and friction clutches are arranged in series, the friction plates are encapsulated in oil and the clutch can be modulated, and the clutch has inherent hydraulic balance so that engaging pressure of the clutch is not effected by the centrifugal head of the encapsulating oil.

Another aspect of the invention relates to a clutch of the above type in which the friction plate clutch is located radially within the cone clutch and the entire design results in a compact and highly efficient clutch mechanism.

These and other objects and advantages of the present invention will appear hereinafter as this disclosure progresses, reference being had to the accompanying drawings, in which:

FIGURE 1 is a longitudinal cross sectional view of a dual clutch embodying the present invention; and FIGURE 2 is a longitudinal, cross sectional view of a clutch embodying a modified form of the present invention which includes the means for encapsulating the friction clutch plates in oil.

It will be appreciated that the invention has been shown as applied to a transmission having dual clutches C1 and C2 and as they are similar, only one will be described.

Referring in more detail to the drawings, a driving member D is fixed to drive shaft S and includes an annular shell 1 which together with the radial portion 1a defines an annular chamber 2 containing a slidable piston 3. Portion 1a is fixed to input shaft S. The shell also has a series of internal splines 4 around its internal surface, and peripheral teeth 5 of the piston 3 are slidably engaged in these splines. Thus the piston rotates with the shell 1 as a unit and can shift axially relative to it. For example, when the chamber 2 is pressurized, the piston 3 moves to the right toward the engaging position for the combined clutch C1. Also splined to the internal surface of the shell is a back up member 6 which is prevented from axial displacement to the right (as viewed in the drawings) by the snap ring 7. The piston 3 has an inclined or bevelled clutch surface 8 while the back up member 6 has an oppositely inclined surface 9.

A driven member 10 is rotatably mounted on the shaft S and has a set of splines 11 around its periphery. The driven member constitutes the output member and is connected to any suitable load (not shown).

An intermediate member I is located between the driving and driven members and is comprised of two axially separable portions 13 and 14. These portions are rotatably mounted on the driven member 10 by means of the anti-friction bearings 15 and 16 respectively. The periphery of the portions 13 and 14 is formed respectively, by the inclined clutch surfaces 17 and 18 which are engageable with the surfaces 8 and 9 respectively of the driving member.

Thus the cone clutch is comprised of the two pairs of oppositely inclined surfaces 8, 17 and 9, 18.

Portions 13 and 14 are fixed together for rotation as a unit by means of their spline portions 20 and 21, respectively, which permit relative axial movement between the portions but prevents relative rotation therebetween.

Resilient means are provided to urge portions 13 and 14 axially apart and this resilient means takes the form of a Belleville spring 26 located between the portions.

Friction plates 22 are fixed on splines 11 of the driven member while interleaved friction plates 23 are engaged on the spline portion 20 of the intermediate member. Thus, these plates are axially slidable on their respective members but are fixed for rotation therewith. The plates can be clamped together, as will appear, so as to transmit driving force from the intermediate member to the driven member. The spring 26 urges these friction plates apart or to the disengaged position while sufficient movement of the piston 3 to the right causes their engagement.

OPERATION

The device shown in FIGURE 1 is in the inoperative or neutral position wherein both the cone clutch and the friction plate clutch are disengaged. When it is desired to engage the combined clutch, pressure fluid is admitted to chamber 2 thus causing the piston to move to the right. This initial movement causes the cone surfaces 8 and 17 to be engaged, consequently causing rotation of the intermediate member 13. If the movement of portion 13 to the right is sufficient, the friction plates will begin to be clamped up and further movement will cause further engagement. Then, further movement of the piston 3 to the right overcomes the bias of spring 25 and causes the cone surfaces 9 and 18 to become engaged and thereupon the entire clutch is in full engagement.

Another sequence of operation of the various friction clutch surfaces can be obtained by choosing a stronger spring 26. For example, spring 26 may be of such strength so that it can hold portions 13 and 14 of the intermediate member apart until movement of piston 3 causes both pairs of the cone surfaces 8, 17 and 9, 18 to become engaged. Thus when the cone clutch is fully engaged, continued movement of the piston 3 to the right overcomes the resiliency of spring 26 and results in clamping up of the friction plates and full engagement of the combined clutch.

FIGURE 2

FIGURE 2 shows the invention as applied to a cone and plate clutch reverse transmission. Parts similar to those in the FIGURE 2 device have been similarly numbered.

The transmission is enclosed in a housing H in which the input or drive shaft S is suitably piloted by an anti-friction bearing assembly B in the output member 10, and by bearing B1 mounted in the end of housing. As in the FIGURE 1 device, the central portion 1a of sleeve 1 is keyed to shaft S for rotation therewith as a unit.

As the dual clutches C3 and C4 are similar, only one will be described except to say that clutch C4 has its output member 10a as a sleeve which is mounted on anti-friction bearings 16a and 16b. A gear 16c is fixed to output sleeve 10a and is in constant mesh with a gear 16d fixed on layshaft 16e. The other output member 10 of the transmission is journalled on anti-friction bearings 16f and 16g in the housing. A gear 16h is fixed to output member 10 and is in constant mesh with gear 16i fixed to layshaft 16e.

Operation of clutch C3 or C4 causes rotation of layshaft 16e in one direction or the other.

The intermediate member I is located between the drive member 1 and output member 10 and is comprised of axially separable portions 13 and 14 which rotate together as a unit. Friction plates 22, 23 are located between the portions 13 and 14 and are drivingly engaged when the intermediate portions are pinched or clamped together.

A pair of engageable cone clutch surfaces 8, 17 and 6, 18 are located between each of the intermediate portions 13 and 14, respectively and the driving shell 1.

Pressure fluid in chamber 2 can cause shifting of the piston 3 to the right and consequent engagement of the cone clutches and friction clutch as previously described.

The resilient means S is shown here as a Belleville spring S effectively acting between portion 13 and output member 10 via needle bearing 15a.

Means are provided in the FIGURE 2 device for encapsulating the friction clutch plates 22 and 23 in oil, thereby continually lubricating them. This means takes the form of a ring disc 30 held captive in the intermediate member 13 by snap ring 31 and having an O-ring seal 32 for sealing engagement with member 13.

Disc 30, together with the axial portion 13a and radial portion 13b of intermediate member 13, forms a radially inwardly facing pocket P in which the friction discs 22, 23 are located.

As the members 13 and 14 are rotated by engagement of the cone clutches, oil or other fluid is introduced via passages 33, 34 and 35 from rifle drilling 36 and is thrown radially outward by centrifugal force and held within the pocket P to keep the plates immersed.

The centrifugal head built up in the pocket P has no effect on clutch clamp-up pressure because it is self contained, i.e., reacting only within the cup, axially against only portion 13b and disc 30.

This encapsulating oil feature for the plates is possible in this design without harmful effects of high release drag because complete and instantaneous release is obtained by the cone clutches.

RÉSUMÉ

With the present invention, a combined cone and friction plate clutch has been provided which permits initial operation by the cone surface and then any degree of modulation of the clutch by means of the friction plate surface. During this modulation or acceleration period, the friction plates are operating efficiently and effectively to dissipate the heat generated. Full torque can then be transmitted through the cone clutch after the speeds of the driving and driven members have been substantially synchronized.

Various modes of carrying out the invention are contemplated as being within the scope of the following claims particularly pointing out and distinctly claiming the subject matter which is regarded as the invention:

1. A combined cone and friction plate clutch comprising, a driving member, a driven member co-axially arranged with said driving member, and an intermediate member located between said driving and driven members, interleaved friction plates between said intermediate and driven members and forming a disengageable driving connection therebetween, said intermediate member comprising a pair of axially separable portions which rotate together as a unit, said friction plates being located between said portions and drivingly engaged when said portions are urged axially toward one another, a pair of engageable cone clutch surfaces between each of said intermediate portions and said driving member, and actuating means for causing axial movement and engagement of at least some of said cone surfaces and engagement of said friction plates.

2. The clutch set forth in claim 1 including resilient means between said intermediate portions for urging the latter axially away from one another and said cone surfaces towards an engaging position.

3. The clutch as described in claim 1 further characterized in that said intermediate member is journalled by means of anti-friction bearings on said driven member.

4. The clutch of claim 1 further characterized in that said driving member includes a cylindrical shell around said clutches, and said actuating means includes a fluid operating piston slidably mounted within said shell.

5. The clutch as defined in claim 1 further characterized in that one cone clutch surface of each of said pairs of surfaces are located on said driving member in axially spaced and oppositely inclined position, and said intermediate member is axially located therebetween.

6. The clutch as defined in claim 2 further characterized in that one cone clutch surface of each of said pairs of surfaces are located on said driving member in axially spaced and oppositely inclined position, and said intermediate member is axially located therebetween.

7. The clutch as defined in claim 4 further characterized in that one cone clutch surface of each of said pairs of surfaces are located on said driving member in axially spaced and oppositely inclined position, and said intermediate member is axially located therebetween.

8. The clutch of claim 2 further characterized in that said driving member includes a cylindrical shell around said clutches, and said actuating means includes a fluid operating piston slidably mounted within said shell.

9. The clutch as defined in claim 8 further characterized in that one cone clutch surface of each of said pairs of surfaces are located on said driving member in axially spaced and oppositely inclined position, and said intermediate member is axially located therebetween.

10. A combined cone and friction plate clutch comprising, a driving member, a driven member co-axially arranged with said driving member, and an intermediate member located between said driving and driven members, interleaved friction plates between said intermediate and driven members and forming a disengageable driving connection therebetween, said intermediate member comprising a pair of axially separable portions which rotate together as a unit, said friction plates being located between said portions and drivingly engaged when said portions are urged axially toward one another, one of said separable portions having an axially extending part and a radially extending part, a disc fixed on said one separable portion and defining a radially inwardly facing pocket with said parts, said friction plates being located in said pocket, and means for introducing fluid into said pocket to encapsulate said plates, a pair of engageable cone clutch surfaces between each of said intermediate portions and said driving member, and actuating means for causing axial movement and engagement of at least some of said cone surfaces and engagement of said friction plates.

11. The clutch set forth in claim 10 including resilient means between said intermediate portions for urging the latter axially away from one another and said cone surfaces towards an engaging position.

12. The clutch as described in claim 10 further characterized in that said intermediate member is journalled by means of anti-friction bearings on said driven member.

13. The clutch of claim 10 further characterized in that said driving member includes a cylindrical shell around said clutches, and said actuating means includes a fluid operating piston slidably mounted with said shell.

14. The clutch as defined in claim 10 further characterized in that one cone clutch surface of each of said pairs of surfaces are located on said driving member in axially spaced and oppositely inclined position, and said intermediate member is axially located therebetween.

15. The clutch as defined in claim 11 further characterized in that one cone clutch surface of each of said pairs of surfaces are located on said driving member in axially spaced and oppositely inclined position, and said intermediate member is axially located therebetween.

16. The clutch as defined in claim 13 further characterized in that one cone clutch surface of each of said pairs of surfaces are located on said driving member in axially spaced and oppositely inclined position, and said intermediate member is axially located therebetween.

17. The clutch of claim 11 further characterized in that said driving member includes a cylindrical shell around said clutches, and said actuating means includes a fluid operating piston slidably mounted within said shell.

18. The clutch as defined in claim 17 further characterized in that one cone clutch surface of each of said pairs of surfaces are located on said driving member in axially spaced and oppositely inclined position, and said intermediate member is axially located therebetween.

References Cited

UNITED STATES PATENTS 2,137,977  11/1938  Kattwinkel _____ 192—48
2,352,478   6/1944  Halford _____ 192—48

BENJAMIN W. WYCHE III, *Primary Examiner.*